United States Patent
Shafer et al.

(10) Patent No.: US 8,760,100 B2
(45) Date of Patent: Jun. 24, 2014

(54) ELECTRIC MANIPULATOR JOINT

(75) Inventors: Richard Shafer, Webster, TX (US);
William Robertson, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 301 days.

(21) Appl. No.: 13/272,069

(22) Filed: Oct. 12, 2011

(65) Prior Publication Data
US 2012/0089254 A1   Apr. 12, 2012

Related U.S. Application Data

(60) Provisional application No. 61/392,269, filed on Oct. 12, 2010.

(51) Int. Cl.
*H02K 17/32*   (2006.01)
*H02H 7/085*   (2006.01)

(52) U.S. Cl.
CPC .................................. *H02H 7/0851* (2013.01)
USPC .......................................... 318/434; 318/432

(58) Field of Classification Search
CPC .................................................... H02H 7/0851
USPC .......................................... 318/434, 432, 254
See application file for complete search history.

(56) References Cited

U.S. PATENT DOCUMENTS

| | | | |
|---|---|---|---|
| 4,535,405 A | | 8/1985 | Hill et al. |
| 5,155,423 A | * | 10/1992 | Karlen et al. ............ 318/568.11 |
| 5,523,662 A | * | 6/1996 | Goldenberg et al. .... 318/568.11 |
| 6,850,021 B1 | | 2/2005 | Golownia et al. |
| 2010/0101346 A1 | | 4/2010 | Johnson et al. |

* cited by examiner

*Primary Examiner* — David Luo
(74) *Attorney, Agent, or Firm* — McKenna Long & Aldridge LLP (57) ABSTRACT

A manipulator joint includes an encoder having a body and shaft. The encoder body may be fixed to a first housing and the encoder shaft may be fixed to a second housing. The second housing is separate from, distal to, and rotatable with respect to the first housing. Rotation of the second housing may be about a common axis shared with the first housing. A hollow driveshaft, rotatably coupled to the second housing, extends across the joint from the second to the first housing. A torque limiter may be fixedly coupled to the second housing and releasably coupled to the driveshaft. The encoder may be configured to output an absolute angular position of the first housing with respect to the second housing. A method of detecting an over-torque condition of the manipulator joint includes transmitting commands from a processor to the drive motor and receiving data from the encoder.

20 Claims, 9 Drawing Sheets

ELECTRIC MANIPULATOR JOINT

This application claims priority to U.S. Provisional Application No. 61/392,269, filed Oct. 12, 2010, the entire contents of which is incorporated by reference herein.

FIELD OF THE INVENTION

This invention relates generally to the electric manipulator arms such as those in the robotic and/or remotely operated vehicle fields, and more specifically to an improved and useful electric manipulator joint for use with manipulator arms.

BACKGROUND OF THE INVENTION

Remotely operated vehicles are used in various situations where unsafe or hostile conditions are present. For example, bomb disposal, fire rescue, chemical spills, and military combat are just a few uses in such situations. Such systems typically include a remotely controlled or robotic manipulator arm for carrying out various tasks. It is desirable that the manipulator arm be light and strong. A manipulator arm typically includes one or more manipulator joints, and one or more manipulator links, where the manipulator joint architecture is a critical element of the overall mechanical system. As used herein, a manipulator link refers to an interconnecting structural member extending between two manipulator joints or a structural member extending from one manipulator joint. Desirable features of a manipulator joint used in field operations include a rugged drive mechanism, environmentally sealed housing, joint overload protection, and joint position feedback.

Unlike fixed manipulator arms, for example those used in a factory, where the loads are known and can be accounted for in the manipulator arm design, a manipulator arm on a remotely operated vehicle may encounter a wide variety of loads placed upon it. Further, the remotely operated vehicle may overturn or encounter an obstacle placing a very large load on the arm. The forces resulting from these loads are focused on the joints of the arm.

In order to prevent damage to a joint, typical manipulator joints may include a torque limiter. The torque limiter is designed to provide movement of the joint when a certain amount of torque is placed on the joint. This prevents the joint from being damaged and saves the cost of a repair or replacement of the joint.

Typical joints include a drive motor. Further, an encoder at the drive motor typically determines the position of the drive motor's shaft. The rotation of the drive motor shaft leads to a known movement of the arm that can be determined using the encoder's data and knowledge of the drive mechanism of the joint. For example, the power transmitted from the drive motor shaft to the joint may be geared such that ten drive motor shaft revolutions in a clockwise direction corresponds to five degrees of joint rotation in a counter-clockwise direction. In this example, a processor could calculate that encoder output data indicating thirty driveshaft revolutions in a clockwise direction corresponds to a joint rotation of fifteen degrees in a counter-clockwise direction. However, the processor coupled to the typical joint could not use this information to determine if the torque limiter in a joint had slipped due to overload.

A problem occurs when excessive torque is placed upon the joint of the manipulator arm and the manipulator joint slips from a known first position to a second position without a corresponding rotation of the drive motor shaft. In such a case, the second position is unknown by the motor encoder. In fact, if the slippage is not detected, and if the second position is calculated using data from an encoder of the drive motor, the calculated second position will not accurately reflect the true second position. For example, say that a weight resting on a surface was attached to an end of a manipulator arm via a flexible tether. A user desires to lift the weight above the surface and a rotation of a manipulator joint, at the opposite end of the arm, would affect such lifting. Assume however that the weight at the end of the arm would result in a torque at the joint that was greater than a maximum torque set for the joint's torque limiter. In such a case, the drive motor shaft would rotate and cause the joint to proportionally rotate until all of the slack was removed from the tether and tension was added to the tether. Up to this point, the joint's position is determinable given the encoder's data and the knowledge of the drive mechanism of the joint. However, just after this point, the drive motor will continue to rotate while the shaft remains stationary due to the slippage of the joint's torque limiter. As a consequence, because joint position is based solely on data from the encoder operationally connected to the drive motor shaft and knowledge of the drive mechanism of the joint, the actual position of the joint is unknown. Consequently, a reset or recalibration must be performed. Such a reset or recalibration may even be necessary when the manipulator arm has not been in use, or has been unpowered, because unknown loads may have caused slippage of the manipulator joint during handling or transport. Further, the operator may not be aware of the slippage caused by an overload condition and may not be able to properly initialize or control the manipulator arm.

Thus, there is a need in the electric manipulator joint field to create an improved and useful joint and encoder device to solve the problems mentioned above.

SUMMARY OF THE INVENTION

The present invention provides for a manipulator joint that includes an encoder having an encoder body and an encoder shaft rotatably coupled thereto, and configured to output data indicative of an angular position of the encoder body with respect to the encoder shaft, a first housing having the encoder body fixedly coupled to a proximal side thereof, a second housing that is separate from and distal to the first housing, rotatable with respect to the first housing about a common axis shared with the first housing, and where a distal end of the encoder shaft is fixed to the second housing. A driveshaft having a distal end rotatably coupled to the second housing, via a mechanical power transmission system and a drive motor, where the driveshaft is hollow and extends across the joint from the second housing to the first housing is included in the manipulator joint. A torque limiter that is fixedly coupled to the first housing and releasably coupled to the driveshaft is also included in the manipulator joint.

A method of detecting an over-torque condition of a manipulator joint such as that described above includes commanding, by a processor, the drive motor to rotate in a given direction at a given speed, receiving, at the processor, data from the absolute encoder, wherein the data is indicative of an absolute angular position of the first housing with respect to the second housing, calculating an expected angular position of the first housing with respect to the second housing, comparing the calculated expected angular position of the first housing with respect to the second housing to the absolute angular position of the first housing with respect to the second housing provided by the encoder, and taking corrective action if the calculated expected angular position of the first housing with respect to the second housing does not correspond to the absolute angular position of the first housing with respect to the second housing provided by the encoder.

BRIEF DESCRIPTION OF THE DRAWINGS

Several figures are provided herein to further the explanation of the present invention.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The invention described in this application seeks to solve the problems mentioned above by providing a joint that incorporates an encoder whose output data reflects the absolute position of the manipulator joint even after slippage of the joint due to excessive torque applied to the joint's torque limiter. Additionally, the application provides a joint whose absolute position is retained even when its encoder has no power.

Figure 1:
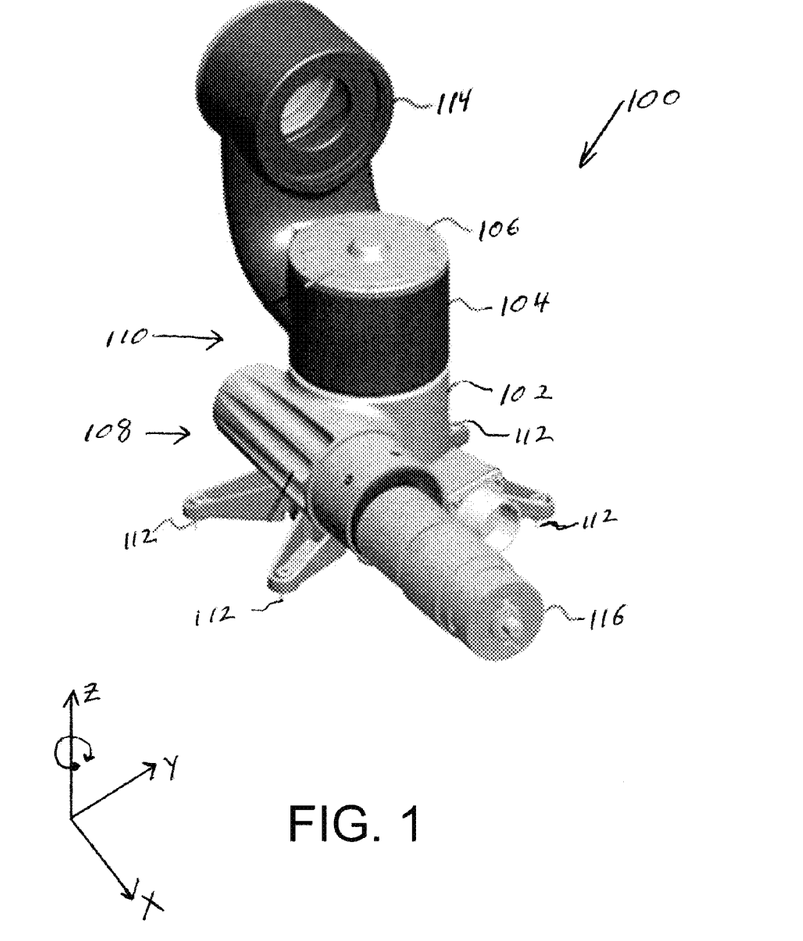
FIG. 1 illustrates a manipulator joint according to an embodiment of the invention.

FIG. 1 illustrates a manipulator joint 100 according to an embodiment of the invention. In the embodiment of FIG. 1, an encoder and encoder shaft configured in accordance with the embodiment of the invention are concealed from view by housings 102, 104 and a protective cover 106. The manipulator joint 100 may be comprised of two halves or portions, a drive-side 108 and a driven-side 110. As used herein, the housing on the drive-side 108 is referred to as the "drive housing" and the housing on the driven-side 110 is referred to as the "driven housing." Mounting features integral to the drive housing 102 and driven housing 104 may be configured to receive fasteners 112 and manipulator link (not shown), respectively, in accordance with embodiments of the invention. Drive housing 102, driven housing 104, and protective cover 106 provide environmental protection to mechanical and electrical components within the joint 100, such as the encoder and encoder shaft configured in accordance with an embodiment of the invention. Environmental protection may encompass weather resistance and protection of the interior of the joint from external contaminants such as sand, liquids, solvents, or gasses.

The manipulator joint 100 of FIG. 1 is configured to be mounted to a surface (not shown) by fasteners 112 projecting from legs integral to the drive housing 102. The joint 100 rotates about the z-axis. In the embodiment of FIG. 1, the encoder shaft (similar to 262, FIG. 3) is coincident with the z-axis. The joint 100 may find utility when the drive housing is secured to a platform (not shown) and the driven housing is coupled to an arm of a robotic device via mount 114. In the configuration shown, mount 114 is integral to driven housing 104. In this configuration, the arm coupled to mount 114 may be caused to rotate about the z-axis. A drive motor 116 extends in the x-axis direction from the drive housing 102. Examples of drive motors included brushed DC or brushless DC servo motors which may or may not have integrated gear heads to increase torque and reduce speed. Other types of drive motors are within the scope of the invention.

Figure 2A:
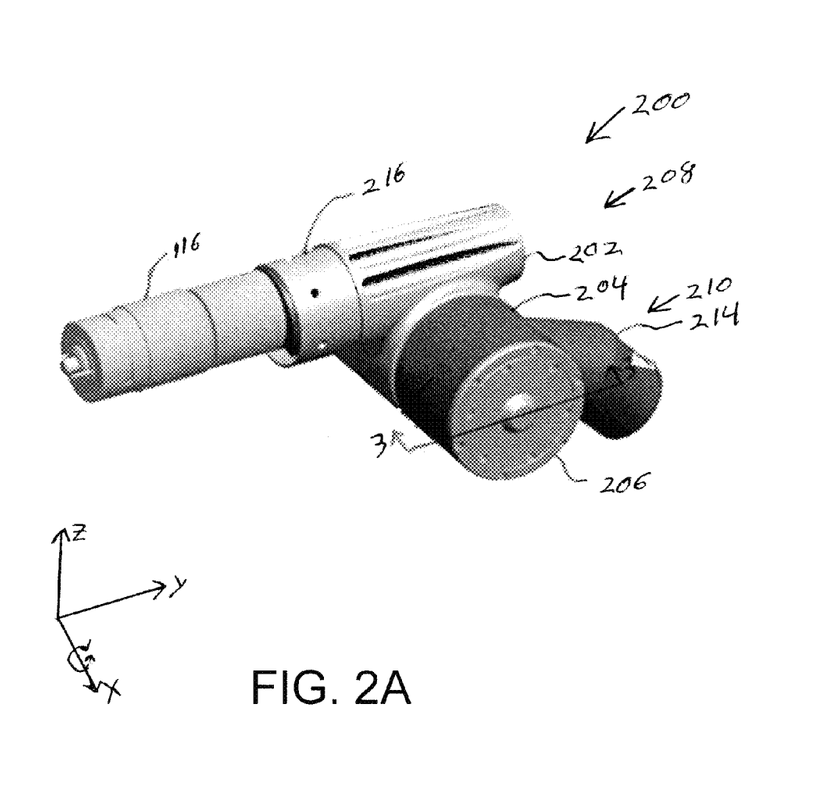
FIG. 2A illustrates a manipulator joint according to another embodiment of the invention.

FIG. 2A illustrates a manipulator joint 200 according to another embodiment of the invention. In the illustration of FIG. 2A, an encoder and encoder shaft configured in accordance with this embodiment of the invention are concealed from view by housings 202, 204 and a protective cover 206. Similar to the embodiment of FIG. 1, the manipulator joint 200 of FIG. 2A may be comprised of a drive side 208 and a driven side 210. Drive housing 202, driven housing 204, and protective cover 206 provide environmental protection to mechanical and electrical components within the joint 200, such as the encoder and encoder shaft configured in accordance with an embodiment of the invention.

The manipulator joint 200 (similar to 600, FIG. 6) is configured to be mounted between a first manipulator link (603, FIG. 6), by attachment of the first manipulator link (603) to the drive mounting interface 216 of the drive housing 202, and a second manipulator link (605, FIG. 6), by attachment of the second manipulator link (605) to the driven mounting interface 214 of the driven housing 204. The first manipulator link (603) may be configured to insert into, or slip over, the drive mounting interface 216. The second manipulator link (605) may be configured to insert into or slip over the driven mounting interface 214. A drive motor 116 extends outwardly in a negative y-axis direction from the drive mounting interface 216 of the drive housing 202. In the embodiment of FIG. 2A, the second manipulator link (605) may be configured to receive the drive motor 116 within a central hollow space of the manipulator link (605). The joint 200 rotates about the y-axis. In the embodiment of FIG. 2A, the shaft (262, FIG. 3) of the encoder (260, FIG. 3) is coincident with the x-axis. The joint 200 may find utility in the act of rotating the first robotic arm about the x-axis relative to the second robotic arm.

Figure 2B:
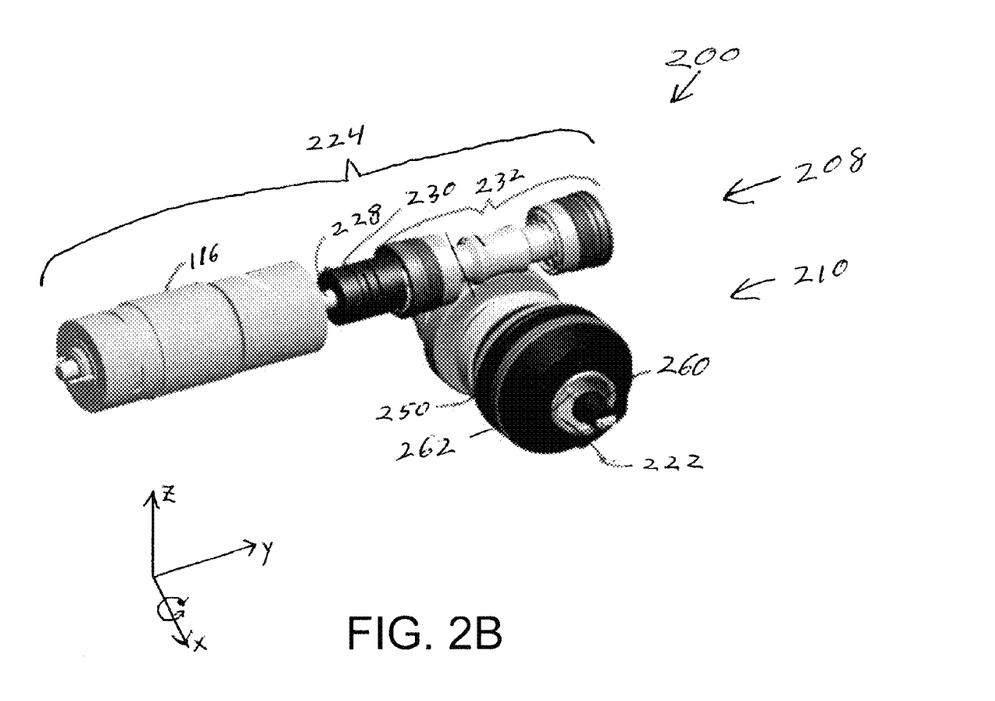
FIG. 2B illustrates the manipulator joint of FIG. 2A with housings and a protective cover removed.

FIG. 2B illustrates the manipulator joint 200 of FIG. 2A with housings 202, 204 and protective cover 206 removed. The encoder 260 and encoder shaft 262 are illustrated as being coaxial with the hollow driveshaft 222. The hollow driveshaft 222 extends from the drive side 208 to the torque limiter assembly 250 on the driven side 210 of the joint 200.

As described below, the body of the encoder 260 may be fixedly coupled to a proximal end of the driven housing 204 while a distal end of the encoder shaft 262 may be fixedly coupled to a distal side of the drive housing 202. The proximal end of the encoder shaft 262 may be rotatably coupled to the encoder 260. Similarly, the encoder shaft 262 may rotatably extend from and be integral to the encoder 260.

In addition to the encoder 260, the encoder shaft 262, and the hollow driveshaft 222, both a driving mechanism 224 and a torque limiter assembly 250 are represented in the illustration of FIG. 2B. On the drive side 208 of the joint 200, the driving mechanism 224 includes the drive motor 116 having a driveshaft 228, a shaft coupling 230, such as an Oldham or bellows coupling to allow for radial and axial misalignment, to couple the driveshaft 228 to a first portion of a mechanical power transmission system 232. The driven side 210 of the joint 200 includes the torque limiter assembly 250 and a second portion of the mechanical power transmission system 232.

The drive motor 116 is coupled to and drives the transmission system 232, which in turn transfers the power to the hollow driveshaft 222. The transmission system 232 may include a gear driven by the drive motor 116 that engages with a corresponding gear on the hollow driveshaft 222 to drive the joint 200. There is typically a speed reduction in the gearing to reduce the high rotation rate of the motor down to a much lower rotation rate of the joint. The gearing reduction therefore allows for fine control of the motion and position of the manipulator joint. The gear reduction also increases torque output.

In the embodiment of FIG. 2B, the exemplary transmission system 232 is depicted as a high reduction ratio conventional or double enveloping worm gear set. The double enveloping worm gear set provides a high strength and torque capacity in a relatively small gear set size as compared to conventional worm gear sets. This gear set cannot be back-driven, which allows the joint 200 to hold position in a powered down state without the need for a motor brake. Further, this gear set may provide a lower backlash joint than a standard worm gear set. A standard worm gear set may be used instead of the double enveloping worm gear set where low cost is desirable and a lower torque capacity for a given size is acceptable. Also, a higher cost harmonic drive gear set may be used that provides a compact high efficiency joint with high torque capacity and zero backlash. Other types of mechanical power transmission systems are within the scope of the invention.

Figure 3:
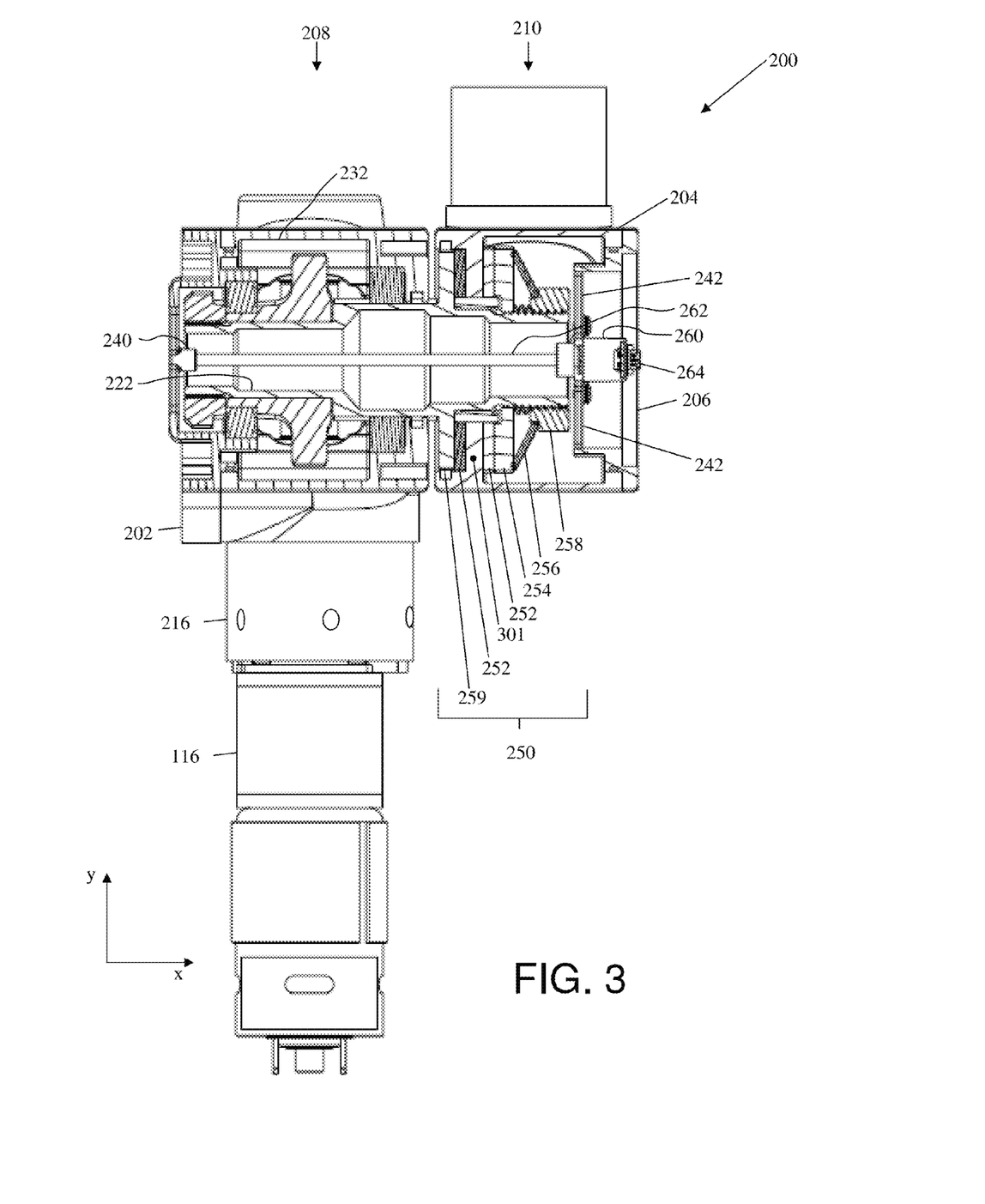
FIG. 3 is a schematic representation of a partial cut-away view of the manipulator joint of FIG. 2A.

FIG. 3 is a schematic representation of a partial cut-away view along plane 3-3 of the manipulator joint 200 of FIG. 2A. In the illustration of FIG. 3, a portion of the drive housing 202, the drive mounting interface 216 of the drive housing 202, and the drive motor 116 are depicted in an aerial view without cut-away. FIG. 3 includes a partial representation of the mechanical power transmission system 232 of FIG. 2B. A detailed cross-sectional view of the transmission system 232 of FIG. 2B is omitted for the sake of clarity of the drawing.

As stated above, the drive motor 116 and the mechanical power transmission system 232 drive the motion of the joint 200. The drive motor 116 and the mechanical power transmission system 232 may be designed to provide the necessary driving force to manipulate the joint 200 according to an expected load. The torque limiter assembly 250 should act to prevent damage to the manipulator joint 200 and/or manipulator link(s) of a manipulator arm.

The hollow driveshaft 222, as the name implies, is hollow and extends between the drive housing 202 and the driven housing 204. The hollow driveshaft 222 provides a central wiring passage for power and data cables needed for various functions of a manipulator arm. Passage of such cables through the hollow driveshaft 222 allows for communication across the joint 200.

The driven housing 204 encloses the portion of the joint 200 that is driven by the drive motor 116 via the hollow driveshaft 222. Housed within the driven housing 204 are a torque limiter 250 and an encoder 260.

In the embodiments described herein, the torque limiter 250 is coupled to the driven housing 204 and the hollow driveshaft 222. The torque limiter 250 may be of any type that provides both sufficient torque transfer and torque limiting protection, and may, for example, utilize friction materials or ball detents between the drive and driven sides of the torque limiter 250. Clutch plates comprised of friction materials are depicted in the embodiment of FIG. 3. As indicated above, other types of torque limiters/torque limiter assemblies are within the scope of the invention.

In FIG. 3, an example of a torque limiter 250 includes multiple clutch friction disks 252, a pressure plate 254, a disc spring 256, and a preload nut 258. A driveshaft flange 259 may be integral to the hollow driveshaft 222. A driven housing flange 301 is located between the pressure plate 254 and the driveshaft flange 259. The clutch friction disks 252 are located adjacent to both sides of the drive housing flange 301. The disc spring 256 applies a force that acts to decrease the distance between the driveshaft flange 259 and the driven housing flange 301. Decreasing the distance between flanges 259 and 301 forces the clutch friction disks 252 to clamp onto a driven housing flange 301 of the driven housing 204. The preload nut 258 allows for adjustment of the force applied by the disc spring 256 on the pressure plate 254. Such a design may reduce the number of components in the joint 200 and simplifies assembly and disassembly of the joint 200.

In the exemplary embodiments described herein, the hollow driveshaft 222 rotates at the same speed as the driven housing 204 when the force applied by the disc spring 256 on the clutch friction discs 252 is sufficient to prevent the driveshaft flange 259 from rotating at a different speed from the driven housing flange 301.

When torque increases to an undesirable level, the friction between the clutch friction disks 252, the driveshaft flange 259, and the pressure plate 254 is overcome and there is movement, or slippage, between the surfaces of the clutch friction disks 252 and the driven housing flange 301. When the clutch surfaces slip, the driven housing 204 correspondingly slips with respect to the hollow drive shaft 222, and hence the drive housing 202. This slippage may avoid an over-torque condition that could damage the joint 200 and/or the manipulator link(s) of a manipulator arm. Despite the slippage, an encoder 260 of a joint 200 as described in the embodiments herein will consistently measure positional information of the drive housing 202 relative to the driven housing 204.

The encoder 260 may be an absolute position type, either single or multi-turn, and thus will accurately measure position of the driven housing 204 with respect to the drive housing 202. In the event that the slippage occurs during a non-powered condition, when power is restored, the correct joint position will be reported at power up.

According to embodiments of the invention, the encoder shaft 262 may be fixedly coupled to the drive housing 202, via a drive-housing/encoder-shaft mating device 240, and therefore rotates with the drive housing 202. Additionally, the absolute encoder 260 may be fixedly coupled to the driven housing 204 via brackets 242, and therefore rotates with the driven housing 204. The encoder shaft 262 extends from the drive side 208 to the driven side 210 through the hollow central portion of the hollow driveshaft 222. The encoder shaft 262 is rotatably coupled to the absolute encoder 260, and therefore provides rotational input to the absolute encoder 260. An electrical interface 264 may provide encoder data from the absolute encoder 260 to, for example, a processor of the manipulator arm or a processor of a remotely operated vehicle having the manipulator arm mounted thereon.

Given such data, the processor could continually or periodically receive updates as to the absolute position of the drive housing 202 relative to the driven housing 204. The processor could use such data to detect slippage of the joint 200. Detection of slippage might be accomplished by comparing a drive signal provided to the drive motor 116 with positional data provided by the absolute encoder 260. If a drive signal indicative of current movement of the drive motor 116 was compared to absolute encoder 260 data indicative of no movement of the joint 200, or of movement of the joint 200 in the wrong direction, then slippage would be indicated. Upon indication of slippage, the processor could stop the drive motor 116 to prevent damage to the motor 116, the joint 200, and/or the manipulator links of the manipulator arm. Other corrective action, such as reversing the direction of the drive motor 116 to relive the torque on the joint 200 could alternatively or additionally be taken. Still other action, such as allowing detected slippage to continue up to a predetermined threshold before taking corrective action could also be accomplished using data related to both the drive motor 116 and the absolute encoder 260. Furthermore, motor speed or other motor operating conditions could be regulated based on feedback from the absolute encoder 260. In some embodiments, the drive motor 116 and the absolute encoder 260 could comprise a portion of a feedback loop.

The mechanical joint of the embodiments described herein may be controlled, for example, by a processor or a digital servo controller and control firmware. According to one embodiment, torque limited joint operation may be conducted via use of a digital servo controller (not shown) and control firmware. During nominal joint 200 operations, the servo controller applies power to the drive motor 116, thus moving the driven housing 204 via the gear set and torque limiter coupling. The position of the driven housing 204 may be returned to the digital servo controller via the absolute encoder 260.

When an overload is applied to the joint 200 during active operation, the torque limiter assembly 250 will slip and allow the driven housing 204 to move with respect to the hollow driveshaft 222. The encoder 260 may register all motion of the driven housing 204, including motion resulting from the drive motor 116 driving the joint 200, as well as motion from the torque limiter 250 slipping.

The servo controller, under command of the firmware, may continuously monitor the position of the joint 200 and compare the monitored value to the commanded position of the joint 200. According to one embodiment, when the two positions are separated by more than a predetermined error limit, due to joint overload (i.e., an over-torque condition), the motor drive 116 may be automatically disabled. The digital servo controller may issue commands to a user interface such that an operator is alerted to the error condition. The operator may choose to re-enable the motor drive after the overload condition is removed.

Because the absolute encoder 260 is fixed to the driven housing 204 and the encoding shaft is fixed to the drive housing 202, a relative motion between the driven housing 204 and the drive housing 202 will be measured by the absolute encoder, even when the torque limiter 250 allows the joint 200 to slip in overload conditions. It is also possible for the absolute encoder to be fixed to the drive housing and the encoder shaft to be fixed to the driven housing. Either arrangement allows for the absolute measurement of the position of the joint 200.

Figure 4:
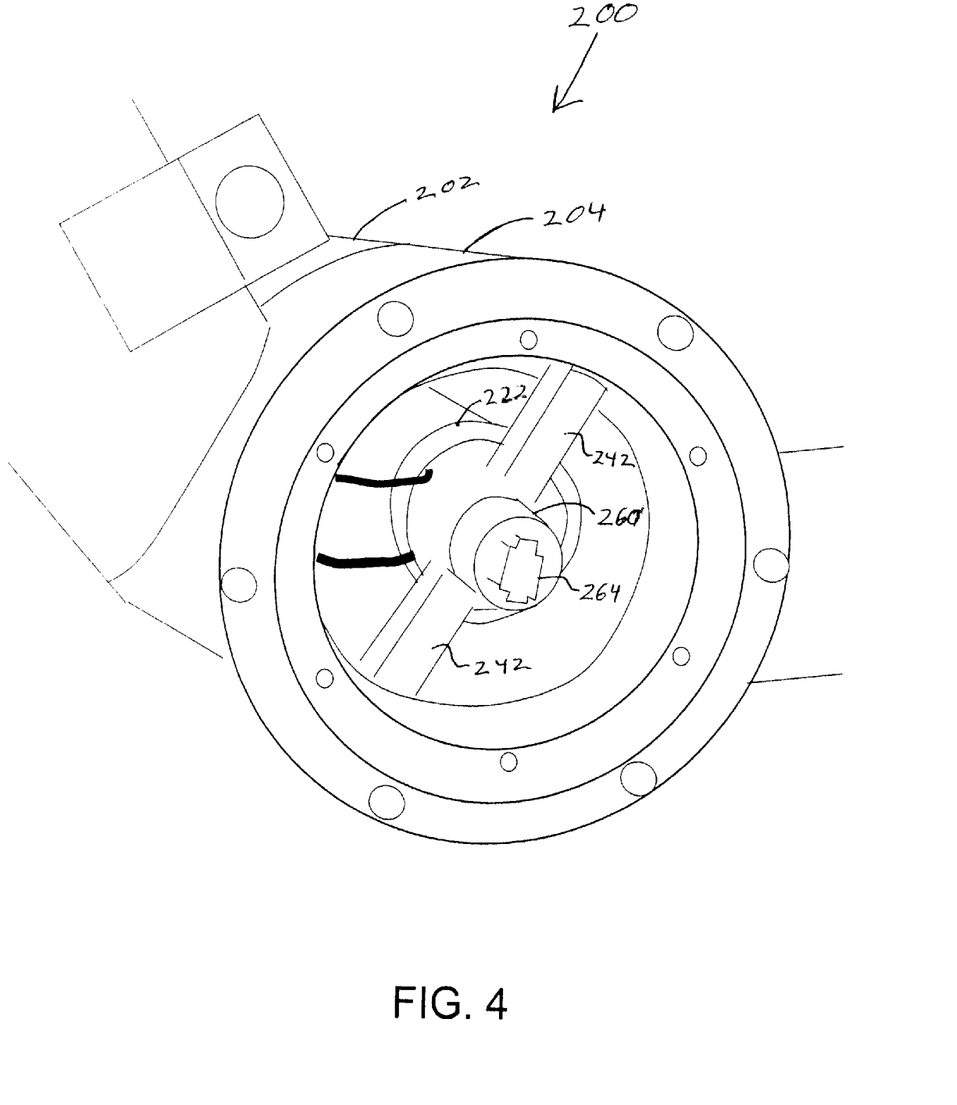
FIG. 4 is a perspective view of a driven side of the manipulator joint of FIG. 2A with the protective cover removed to expose an absolute encoder coupled to the driven housing, in accordance with an embodiment of the invention.

FIG. 4 is a perspective view of the driven housing 204 of the manipulator joint 200 of FIG. 2A with the protective cover 206 removed to expose an absolute encoder 260 coupled to the driven housing 204, in accordance with an embodiment of the invention. Brackets 242, hollow driveshaft 222, and electrical interface 264 are also visible in FIG. 4. Power and data cables are depicted as entering/exiting the hollow driveshaft 222.

Figure 5:
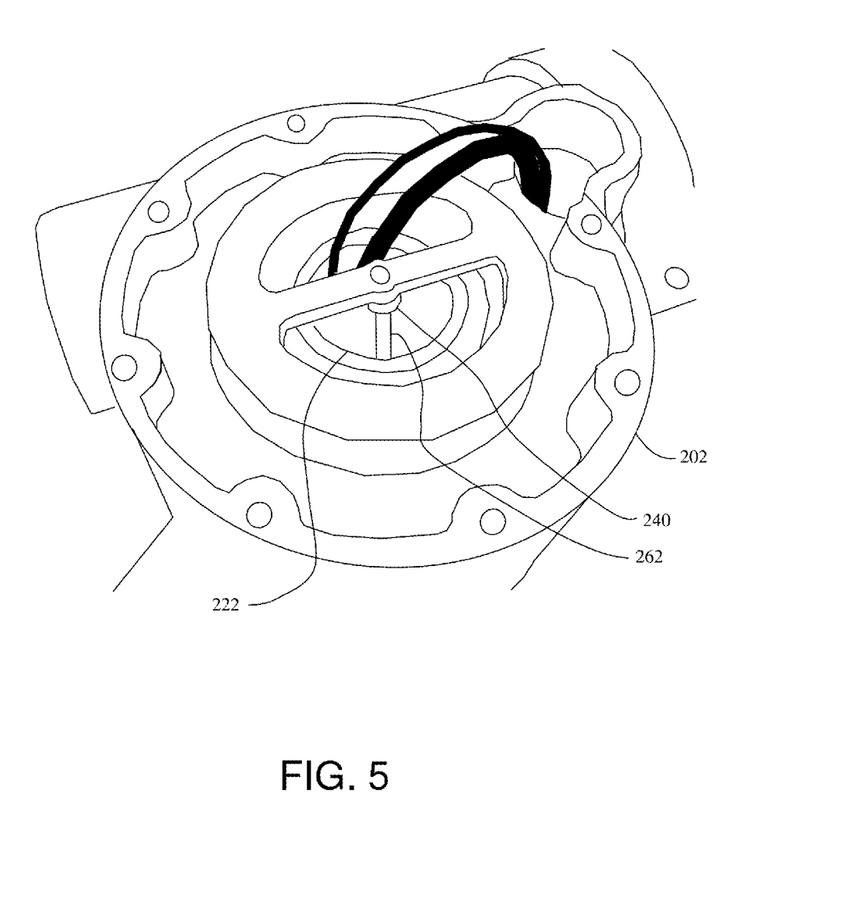
FIG. 5 is a perspective view of a drive side of the manipulator joint of FIG. 2A with a protective cover removed to expose a drive-housing/encoder-shaft mating device, with an encoder shaft mated therein, coupled to the drive housing, in accordance with an embodiment of the invention.

FIG. 5 is a perspective view of the drive housing 202 of the manipulator joint 200 of FIG. 2A with a protective cover (similar to 206) removed to expose the drive-housing/encoder-shaft mating device 240 in accordance with the embodiment of FIG. 2A. Encoder driveshaft 262 and hollow driveshaft 222 are also visible in FIG. 5. Power and data cables are depicted as entering/exiting the hollow driveshaft 222.

Figure 6:
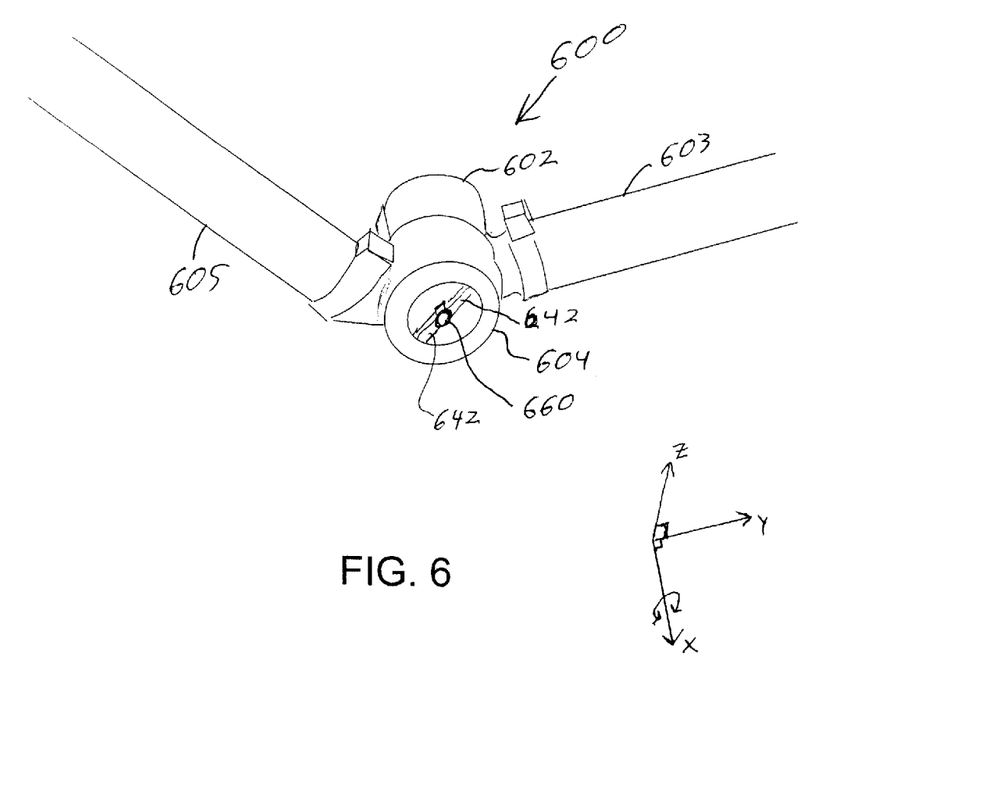
FIG. 6 illustrates a manipulator joint with a protective cover of a driven side removed, where a driven housing is coupled to a first robotic arm, a drive housing is coupled to a second robotic arm, and an absolute encoder is coupled to the driven housing, all in accordance with an embodiment of the invention.

FIG. 6 is an illustration of a manipulator joint 600 (similar to 200) with a protective cover (similar to 206) of a driven side removed, where a drive housing 602 (similar to 202) is coupled to a first manipulator link 603, a driven housing 604 (similar to 204) is coupled to a second manipulator link 605, and an absolute encoder 660 (similar to 260) is coupled to the driven housing 604 via brackets 642, all in accordance with an embodiment of the invention.

Figure 7:
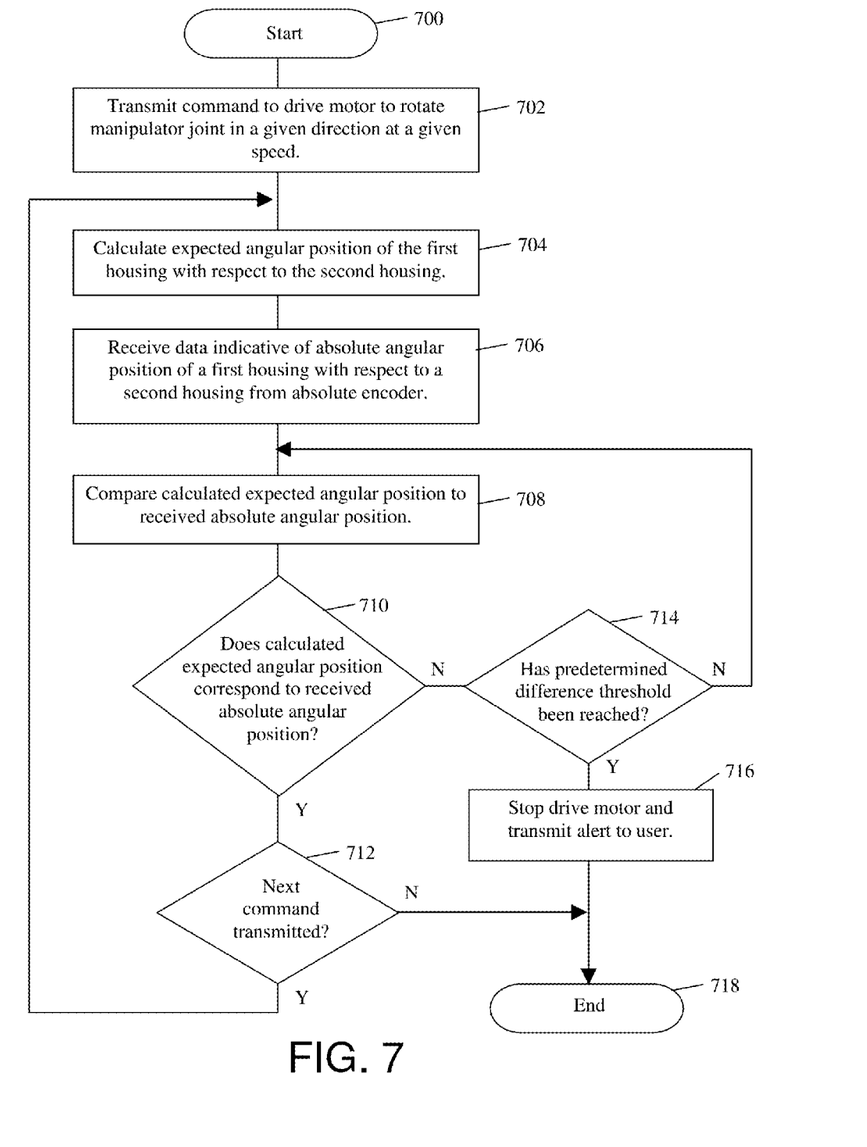
FIG. 7 is a flow diagram of a method in accordance with an embodiment of the invention.

FIG. 7 is a flow diagram of a method in accordance with an embodiment of the invention. As illustrated in FIG. 7, a method of detecting an over-torque condition of the manipulator joint comprising an absolute encoder fixedly coupled to a first housing, the encoder having an encoder shaft rotatably extending therefrom, the encoder shaft fixedly coupled to a second housing, the second housing being rotatable with respect to the first housing about a common axis shared with the first housing, a driveshaft rotatably coupled to the second housing and extending across the joint to an area within the first housing, a torque limiter, fixedly coupled to the first housing and releasably coupled to the driveshaft, a drive motor, and a mechanical power transmission system, coupled at an input side to the drive motor and at an output side to the driveshaft within the second housing, in accordance with an embodiment of the invention, may start at step 700.

At step 702, a processor may transmit a command to a drive motor to rotate manipulator joint in a given direction at a given speed. At step 704, the processor may calculate an expected angular position of the first housing with respect to the second housing based on predetermined knowledge of the drive motor and power transmission system of the manipulator joint. At step 706, the processor may receive data indicative of an absolute angular position of a first housing with respect to a second housing from the absolute encoder. Data may be received continuously or periodically. At step 708, the processor may compare the calculated expected angular position to the absolute angular position received from the encoder. At step 710, if the calculated expected angular position corresponds to the received absolute angular position, the method continues to step 712. At step 712, if a new command relating to manipulator joint position was transmitted by the processor, the method returns to step 704. If, at step 712, a new command was not transmitted, the method proceeds to step 718, where the method ends. If, however, at step 710, the calculated expected angular position does not correspond to the received absolute angular position, the method continues to step 714. At step 714, the difference in correspondence between the calculated expected angular position and the received absolute angular position is evaluated against a predetermined threshold. If at step 714, the predetermined difference threshold was reached, then action is taken at step 716. Following the taking of the action, the method may proceed to step 718, where the method ends.

In the embodiment of FIG. 7, the exemplary action taken at step 716 includes stopping the drive motor and transmitting an alert to a user. Other actions are also acceptable, such as reversing the direction of the drive motor for a given amount of time. Additionally, various thresholds are available for evaluation, such as a maximum predetermined difference between the calculated and actual angular positions or a maximum predetermined time since the expected angular position ceased corresponding to the received absolute angular position as determined at step 710.

Figure 8:
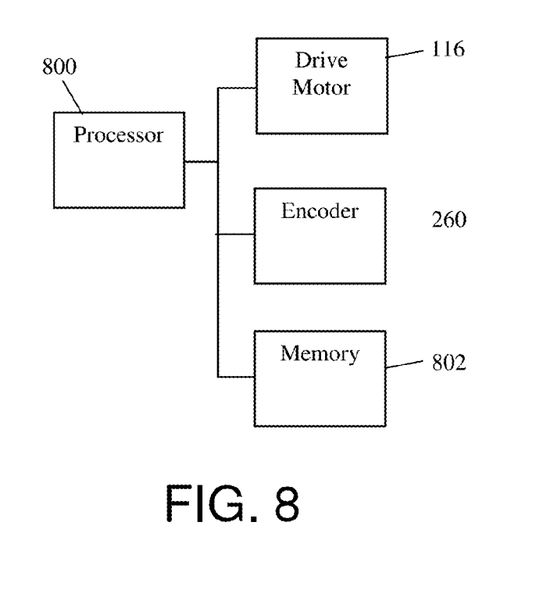
FIG. 8 is a block diagram illustrating one possible interconnection between a processor, a drive motor, an encoder, and a memory, in accordance with an embodiment of the invention.

FIG. 8 is a block diagram illustrating one possible interconnection between a processor 800, the drive motor 116, the encoder 260, and a memory 802, in accordance with an embodiment of the invention. The memory 802 may store instructions, which when executed by the processor cause the processor to perform the steps of a method, such as the method of FIG. 7.

As a person skilled in the art will recognize from the previous detailed description and from the figures and claims, modifications and changes can be made to the preferred embodiments of the invention without departing from the spirit or scope of this invention defined in the following claims. Thus, it is intended that the present invention cover the modifications and variations of this invention provided they come within the scope of any claims and their equivalents.

What is claimed is:

1. A manipulator joint, comprising:
an encoder having an encoder body and an encoder shaft rotatably coupled thereto, and configured to output data indicative of an angular position of the encoder body with respect to the encoder shaft; a first housing having the encoder body fixedly coupled to a proximal side thereof; a second housing: separate from the first housing, distal to the first housing, rotatable with respect to the first housing, about a common axis shared with the first housing, and having a distal end of the encoder shaft fixedly coupled thereto; a driveshaft having a distal end rotatably coupled to the second housing, the driveshaft extending across the joint from the second housing to the first housing and having a proximal end located within the first housing; and a torque limiter, fixedly coupled to the first housing and releasably coupled to the driveshaft wherein the encoder outputs data indicative of a measured absolute angular position of the first housing with respect to the second housing upon a change of state of the encoder from the unpowered to a powered state.

2. The joint of claim 1, wherein the encoder output data is indicative of an absolute value of an angular position of the first housing with respect to the second housing.

3. The joint of claim 1, wherein the encoder retains an absolute angular position of the first housing with respect to the second housing in an unpowered state.

4. The joint of claim 3, wherein the encoder outputs data indicative of a measured absolute angular position of the first housing with respect to the second housing upon a change of state of the encoder from the unpowered to a powered state.

5. The joint of claim 1, wherein the encoder is an absolute encoder.

6. The joint of claim 1, wherein the first housing is fixedly coupled to a first manipulator link extending from the first housing.

7. The joint of claim 1, wherein the second housing is fixedly coupled to a second manipulator link extending from the second housing, or the second housing comprises integral structures configured to secure the second housing to a surface.

8. The joint of claim 7, wherein the integral structures comprise brackets extending from the second housing and configured to penetratingly receive fasteners configured to secure the brackets to the surface.

9. The joint of claim 1, wherein the first housing and the second housing abut one another to form a rotatable seal therebetween.

10. The joint of claim 1, wherein the rotatable seal is weather resistant and protects an interior of the joint from external contaminants.

11. The joint of claim 1, wherein the driveshaft is hollow and the encoder shaft and the driveshaft are coaxial.

12. The joint of claim 1, further comprising:
a drive motor; and
a mechanical power transmission system, coupled at an input side to the drive motor and at an output side to the driveshaft within the second housing,
wherein the driveshaft is rotatably coupled to the second housing via the mechanical power transmission system and the drive motor.

13. The joint of claim 12, wherein one or both of the drive motor and the mechanical power transmission system are enclosed within the second housing.

14. The joint of claim 12, wherein the mechanical power transmission system comprises one of a double enveloping worm gear set, a standard worm gear set, and a harmonic gear set.

15. The joint of claim 1, wherein the torque limiter is configured to bind to the driveshaft when the applied torque to the joint is below a predetermined value and release the driveshaft when the applied torque exceeds the predetermined value.

16. A vehicle comprising at least one manipulator link fixedly coupled to the manipulator joint as claimed in claim 1.

17. A manipulator joint comprising:
an absolute encoder; a first housing fixedly coupled to the absolute encoder;
a second housing fixedly coupled to an encoder shaft, the encoder shaft rotatably extending from the encoder, the second housing being rotatable with respect to the first housing about a common axis shared with the first housing; a driveshaft rotatably coupled to the second housing and extending across the joint to an area within the first housing; a torque limiter, fixedly coupled to the first housing and releasably coupled to the driveshaft; a drive motor; and a mechanical power transmission system housed within the second housing, coupled at an input side to the drive motor and at an output side to the driveshaft within the second housing wherein the encoder outputs data indicative of a measured absolute angular position of the first housing with respect to the second housing upon a change of state of the encoder from the unpowered to a powered state.

18. A method of detecting an over-torque condition of the manipulator joint comprising an absolute encoder fixedly coupled to a first housing, the encoder having an encoder shaft rotatably extending therefrom, the encoder shaft fixedly coupled to a second housing, the second housing being rotatable with respect to the first housing about a common axis shared with the first housing, a driveshaft rotatably coupled to the second housing and extending across the joint to an area within the first housing, a torque limiter, fixedly coupled to the first housing and releasably coupled to the driveshaft, a drive motor, and a mechanical power transmission system, coupled at an input side to the drive motor and at an output side to the driveshaft within the second housing, the method comprising:
- commanding, by a processor, the drive motor to rotate in a given direction at a given speed;
- receiving, at the processor, data from the absolute encoder, wherein the data is indicative of an actual angular position of the first housing with respect to the second housing;
- calculating an expected angular position of the first housing with respect to the second housing;
- comparing the calculated expected angular position of the first housing with respect to the second housing to the actual angular position of the first housing with respect to the second housing; and
- taking corrective action if the calculated expected angular position of the first housing with respect to the second housing does not correspond to the actual angular position of the first housing with respect to the second housing.

19. The method of claim 18, wherein corrective action comprises at least one of:
- waiting, after the over-torque condition is determined, until a predetermined threshold is reached and then either stopping the drive motor or reversing the direction of the drive motor,
- upon detection of the over-torque condition, stopping the drive motor, and
- upon detection of the over-torque condition, reversing the direction of the drive motor.

20. The method of claim 19, wherein the predetermined threshold is one of:
- a maximum predetermined difference between the calculated and actual angular positions, and
- a maximum predetermined time since the detection of over-torque condition.

* * * * *